United States Patent
Shin et al.

(10) Patent No.: US 10,667,186 B2
(45) Date of Patent: May 26, 2020

(54) METHOD FOR ASSIGNING AND MANAGING REFERENCE SIGNALS IN A MULTI-CELL ENVIRONMENT, AND NETWORK DEVICE AND TERMINAL FOR APPLYING THE METHOD

(71) Applicants: Samsung Electronics. Co., Ltd., Suwon-si (KR); Korea Advanced Institute of Science and Technology, Daejeon (KR)

(72) Inventors: Won Jae Shin, Yongin-si (KR); Young Jun Hong, Seoul (KR); Chang Yong Shin, Seoul (KR); Yong Ho Cho, Chenan-si (KR); Dong Jo Park, Daejeon (KR); Jung Hyun Park, Busan-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/113,439

(22) Filed: Aug. 27, 2018

(65) Prior Publication Data
US 2018/0368033 A1    Dec. 20, 2018

Related U.S. Application Data

(62) Division of application No. 14/928,117, filed on Oct. 30, 2015, now Pat. No. 10,091,695, which is a
(Continued)

(30) Foreign Application Priority Data
Dec. 23, 2009   (KR) .................. 10-2009-0129569

(51) Int. Cl.
    *H04W 36/00*   (2009.01)
    *H04L 5/00*    (2006.01)
    (Continued)

(52) U.S. Cl.
    CPC ....... *H04W 36/0083* (2013.01); *H04L 5/0048* (2013.01); *H04W 16/02* (2013.01);
    (Continued)

(58) Field of Classification Search
    CPC .... H04L 5/0048; H04W 16/02; H04W 16/32; H04W 84/045
    See application file for complete search history.

(56) References Cited

U.S. PATENT DOCUMENTS

| 5,864,549 A | 1/1999 | Honkasalo et al. |
| 6,606,342 B1 | 8/2003 | Banister |

(Continued)

FOREIGN PATENT DOCUMENTS

| KR | 10-2005-0039263 | 4/2005 |
| KR | 10-2005-0040988 | 5/2005 |

(Continued)

OTHER PUBLICATIONS

International Search Report (Form PCT/ISA/210) dated Aug. 25, 2011, in counterpart International Application No. PCT/KR2010/008331 (3 pages, in English).

*Primary Examiner* — Stephen J Clawson
(74) *Attorney, Agent, or Firm* — NSIP Law

(57) ABSTRACT

A method of assigning and managing reference signals in a multi-cell environment, and a network device and a terminal for applying the method, are provided. Reference signal patterns may be assigned to multiple femtocells through a long term coordination of a central control unit that is used to control multiple cells.

5 Claims, 12 Drawing Sheets

Related U.S. Application Data division of application No. 12/907,581, filed on Oct. 19, 2010, now Pat. No. 9,179,320.

(51) Int. Cl.
*H04W 16/02* (2009.01)
*H04W 36/30* (2009.01)
*H04W 16/32* (2009.01)
*H04W 84/04* (2009.01)

(52) U.S. Cl.
CPC ............ *H04W 36/30* (2013.01); *H04W 16/32* (2013.01); *H04W 84/045* (2013.01)

(56) References Cited

U.S. PATENT DOCUMENTS

| | | |
|---|---|---|
| 2006/0133381 A1 | 6/2006 | Wang |
| 2006/0290508 A1 | 12/2006 | Moutchkaev et al. |
| 2007/0097908 A1 | 5/2007 | Khandekar et al. |
| 2007/0155390 A1 | 7/2007 | Kodikara Patabandi et al. |
| 2007/0167180 A1 | 7/2007 | Ramesh et al. |
| 2008/0076425 A1 | 3/2008 | Khetawat et al. |
| 2008/0261563 A1 | 10/2008 | Drevon et al. |
| 2008/0298227 A1 | 12/2008 | Jonsson |
| 2008/0318596 A1 | 12/2008 | Tenny |
| 2009/0041141 A1 | 2/2009 | Wang et al. |
| 2009/0047961 A1* | 2/2009 | Kim ................ H04W 36/00835 455/436 |
| 2009/0135790 A1 | 5/2009 | Yavuz et al. |
| 2009/0247172 A1 | 10/2009 | Palanki et al. |
| 2009/0304100 A1 | 12/2009 | Brehler et al. |
| 2010/0197309 A1* | 8/2010 | Fang ..................... H04W 36/04 455/436 |

FOREIGN PATENT DOCUMENTS

| | | |
|---|---|---|
| KR | 10-2005-0063017 | 6/2005 |
| KR | 10-2007-0025944 | 3/2007 |
| KR | 10-2007-0104865 | 10/2007 |
| KR | 10-2008-0054164 A | 6/2008 |
| KR | 10-2009-0075750 A | 7/2009 |
| WO | WO 2008/057899 A2 | 5/2008 |
| WO | WO 2008/098079 | 8/2008 |

* cited by examiner

METHOD FOR ASSIGNING AND MANAGING REFERENCE SIGNALS IN A MULTI-CELL ENVIRONMENT, AND NETWORK DEVICE AND TERMINAL FOR APPLYING THE METHOD

CROSS-REFERENCE TO RELATED APPLICATION(S)

This present application is a divisional application of U.S. patent application Ser. No. 14/928,117 filed on Oct. 30, 2015 which is a divisional application of U.S. patent application Ser. No. 12/907,581 filed on Oct. 19, 2010, now U.S. Pat. No. 9,179,320, issued on Nov. 30, 2015, which claims the benefit under 35 U.S.C. § 119(a) of Korean Patent Application No. 10-2009-0129569, filed on Dec. 23, 2009, in the Korean Intellectual Property Office, the entire disclosure of which is incorporated herein by reference for all purposes.

BACKGROUND

1. Field

The following description relates to a method of assigning and managing reference signals in a multi-cell environment, and a network device and a terminal for applying the method.

2. Description of Related Art

Research is being conducted on femtocells in order to increase the coverage of conventional macrocells and to improve throughput. Femtocells may be installed in buildings or houses and may assist macrocells and support neighboring terminals. Macrocells are typically located in a higher places and installed by design, whereas femtocells are usually installed by users. As a result, environmental conditions of femtocells are often different from those of macrocells. For example, when a femtocell is installed in a home, an excessive interference caused by neighboring cells may be limited due to signal attenuation caused by a distance between houses, by walls, and the like. However, when a large number of femtocells are installed in a floor of a building, interference may occur because of the neighboring femtocells.

In a current Long Term Evolution (LTE) standard, a reference signal pattern is selected from six reference signal patterns for each cell identification (ID) of each macrocell, and the selected reference signal pattern is used. However, when such a scheme of selecting a reference signal pattern for a macrocell is applied to a femtocell, it may be difficult for a terminal located in the femtocell to estimate a channel of a femtocell for providing a service and channels of cells neighboring the femtocell due to interference around the femtocell.

SUMMARY

In one general aspect, provided is a method of assigning a reference signal pattern in a multi-cell environment, the method comprising receiving femtocell information from a plurality of network devices that include at least one femtocell located adjacent to at least one neighboring cell, receiving a request for reference signal reuse pattern information from the plurality of network devices, and transmitting the reference signal reuse pattern information to the plurality of network devices, wherein the reference signal reuse pattern information is assigned based on a predetermined reference.

The predetermined reference may be used to assign the reference signal reuse pattern information to the plurality of network devices using a time division scheme in the multi-cell environment.

The predetermined reference may be used to assign the reference signal reuse pattern information to the plurality of network devices using a frequency division scheme in the multi-cell environment.

The predetermined reference may be used to assign the reference signal reuse pattern information to the plurality of network devices using a time division scheme and a frequency division scheme in the multi-cell environment.

The method may further comprise maintaining a table used to record a reference signal reuse indicator comprising the assigned reference signal reuse pattern information.

The reference signal reuse indicator may comprise reference signal pattern information and the reference signal reuse pattern information.

In another aspect, provided is a central control unit in a multi-cell environment, wherein the central control unit performs receiving femtocell information from a plurality of network devices that include at least one femtocell located adjacent to at least one neighboring cell, receiving a request for reference signal reuse pattern information from the plurality of network devices, and transmitting the reference signal reuse pattern information to the plurality of network devices, wherein the reference signal reuse pattern information is assigned based on a predetermined reference.

In another aspect, provided is a method of a femtocell in a multi-cell environment for implementing a reference signal pattern, the method comprising receiving neighboring cell information from at least at least one neighboring cell, generating femtocell information by performing a cell search based on the received neighboring cell information, transmitting the femtocell information to a central control unit, requesting the central control unit to transmit reference signal reuse pattern information to be used by the femtocell, and transmitting reference signals to at least one terminal served by the femtocell based on the reference signal reuse pattern information received from the central control unit.

The reference signal reuse pattern information may be assigned to each of the neighboring cell and the femtocell using a time division scheme in the multi-cell environment.

The reference signal reuse pattern information may be assigned to each of the neighboring cell and the femtocell using a frequency division scheme in the multi-cell environment.

The reference signal reuse pattern information may be assigned to each of the neighboring cell and the femtocell using a time division scheme and a frequency division scheme in the multi-cell environment.

In another aspect, provided is a network device served by a femtocell included in a multi-cell environment, wherein the network device performs receiving neighboring cell information from at least one neighboring cell, generating femtocell information by performing a cell search based on the received neighboring cell information, transmitting the femtocell information to a central control unit, requesting the central control unit to transmit reference signal reuse pattern information to be used by the femtocell, and transmitting reference signals to at least one terminal served by the femtocell based on the reference signal reuse pattern information received from the central control unit.

The network device may comprise at least one of a base station, a repeater, and a terminal.

In another aspect, provided is a method of managing a reference signal pattern in a multi-cell environment, the method comprising transmitting a query to update a reference signal reuse pattern to a plurality of network devices served by a femtocell, receiving a neighbor list from the network devices and receiving signal quality information from at least one terminal, the neighbor list comprising at least one neighboring cell located adjacent to the femtocell, updating reference signal reuse pattern information based on the neighbor list and the signal quality information, and transmitting the updated reference signal reuse pattern information to the network devices.

The query may be periodically transmitted.

In another aspect, provided is a method of managing a reference signal pattern in a multi-cell environment, the method comprising receiving a request to update a reference signal reuse pattern and a neighbor list from a plurality of network devices served by a femtocell, the neighbor list comprising at least one neighboring cell located adjacent to the femtocell, adjusting reference signal reuse pattern information assigned to the femtocell, and transmitting the adjusted reference signal reuse pattern information to the network devices.

The request may be triggered based on signal quality information and the signal quality information may be collected by the network devices and received from at least one terminal.

In another aspect, provided is a method of managing a reference signal pattern in a multi-cell environment, the method comprising receiving candidate pattern information from a plurality of network devices served by a femtocell, selecting reference signal reuse pattern information from among the candidate pattern information, and transmitting the selected reference signal reuse pattern information to the network devices.

The method may further comprise receiving a request to update a reference signal reuse pattern from the network devices, wherein the request is triggered based on signal quality information, the candidate pattern information is generated based on a neighbor list, the signal quality information is collected by the network devices and received from at least one terminal, and the neighbor list comprises at least one neighboring cell located adjacent to the femtocell.

The method may further comprise transmitting a query to update a reference signal reuse pattern to the network devices, wherein the query is periodically transmitted, the candidate pattern information is generated based on a neighbor list, and the neighbor list comprises at least one neighboring cell located adjacent to the femtocell.

In another aspect, provided is a central control unit in a multi-cell environment, wherein the central control unit performs transmitting a query to update a reference signal reuse pattern to a plurality of network devices served by a femtocell, receiving a neighbor list from the network devices and receiving signal quality information from at least one terminal, the neighbor list comprising at least one neighboring cell located adjacent to the femtocell, updating reference signal reuse pattern information based on the neighbor list and the signal quality information, and transmitting the updated reference signal reuse pattern information to the network devices.

In another aspect, provided is a method of managing a reference signal pattern in a multi-cell environment, the method comprising receiving a query to update a reference signal reuse pattern from a central control unit of the multi-cell environment, receiving a neighbor list and signal quality information from at least one terminal, the neighbor list comprising at least one neighboring cell located adjacent to the femtocell, transmitting the neighbor list and the signal quality information to the central control unit, and receiving reference signal reuse pattern information from the central control unit and broadcasting the received reference signal reuse pattern information to the terminal.

The query may be periodically received.

In another aspect, provided is a method of managing a reference signal pattern in a multi-cell environment, the method comprising receiving signal quality information from at least one terminal, triggering a request to update a reference signal reuse pattern based on the signal quality information, receiving a neighbor list from the terminal, wherein the neighbor list comprises at least one neighboring cell located adjacent to the femtocell, transmitting the triggered request and the neighbor list to a central control unit, and receiving reference signal reuse pattern information from the central control unit and broadcasting the received reference signal reuse pattern information to the terminal.

In another aspect, provided is a method of managing a reference signal pattern in a multi-cell environment, the method comprising receiving a neighbor list and signal quality information from at least one terminal, the neighbor list comprising at least one neighboring cell located adjacent to the femtocell, transmitting, to a central control unit, candidate pattern information for a reference signal reuse pattern based on the neighbor list and the signal quality information, and receiving reference signal reuse pattern information from the central control unit and broadcasting the received reference signal reuse pattern information to the terminal.

The method may further comprise receiving a request to update the reference signal reuse pattern from the central control unit, wherein the request is triggered based on the signal quality information, the candidate pattern information is generated based on the neighbor list, and the signal quality information is collected by the network devices and received from at least one terminal.

The method may further comprise receiving a query to update the reference signal reuse pattern from the central control unit, wherein the query is periodically received and the candidate pattern information is generated based on the neighbor list.

In another aspect, provided is a network device of a femtocell placed in a multi-cell environment, wherein the network device performs receiving a query to update a reference signal reuse pattern from a central control unit of the multi-cell environment, receiving a neighbor list and signal quality information from at least one terminal, the neighbor list comprising at least one neighboring cell located adjacent to the femtocell, transmitting the neighbor list and the signal quality information to the central control unit, and receiving reference signal reuse pattern information from the central control unit and broadcasting the received reference signal reuse pattern information to the terminal.

The network device may comprise at least one of a base station, a repeater, and a terminal.

In another aspect, provided is a method of acquiring a reference signal pattern of a terminal located in a multi-cell environment, the method comprising transmitting, to a network device of a femtocell, signal quality information and a neighbor list, wherein the neighbor list comprises at least one neighboring cell located adjacent to the femtocell, and receiving reference signal reuse pattern information from the network device.

In another aspect, provided is a terminal, wherein the terminal performs transmitting, to a network device of a femtocell, signal quality information and a neighbor list, wherein the neighbor list comprises at least one neighboring cell located adjacent to the femtocell, and receiving reference signal reuse pattern information from the network device.

In another aspect, provided is a method of managing a reference signal pattern in a femtocell base station, the method comprising maintaining reference signal reuse pattern information, selecting at least one reference signal pattern from among a plurality of reference signal patterns, wherein the plurality of reference signal patterns are included in the reference signal reuse pattern information, and transmitting the selected reference signal pattern to a terminal served by the femtocell.

The selecting may comprise randomly hopping among the plurality of reference signal patterns and selecting at least one reference signal pattern.

The transmitting may comprise calculating the reference signal and a phase term corresponding to a femtocell ID and transmitting a result value obtained by the calculating.

The femtocell identification (ID) may comprise a random seed.

The plurality of reference signal patterns may be orthogonal to each other.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Hereinafter, a method of assigning and managing reference signals in a multi-cell environment such as a Long Term Evolution (LTE) wireless network environment, and a network device employing the method are described. A set of reference signals used in a macrocell and a femtocell may be referred to as a "reference signal pattern," and a set of reference signals other than the reference signals used in a neighboring macrocell may be referred to as a "reference signal reuse pattern." A central control unit and a femtocell may be connected via a wired or wireless network.

The central control unit may manage information regarding a location and a current status of a femtocell, for example an on status, an off status, an inactive status, and the like. The central control unit may manage information regarding a long term resource assignment such as assignment of a reference signal pattern to the femtocell. The long term coordination of a reference signal pattern used in the femtocell may be performed by the central control unit. The central control unit may be connected to macrocells or femtocells via a wired or wireless network. The central control unit may be installed in a base station.

Figure 1:
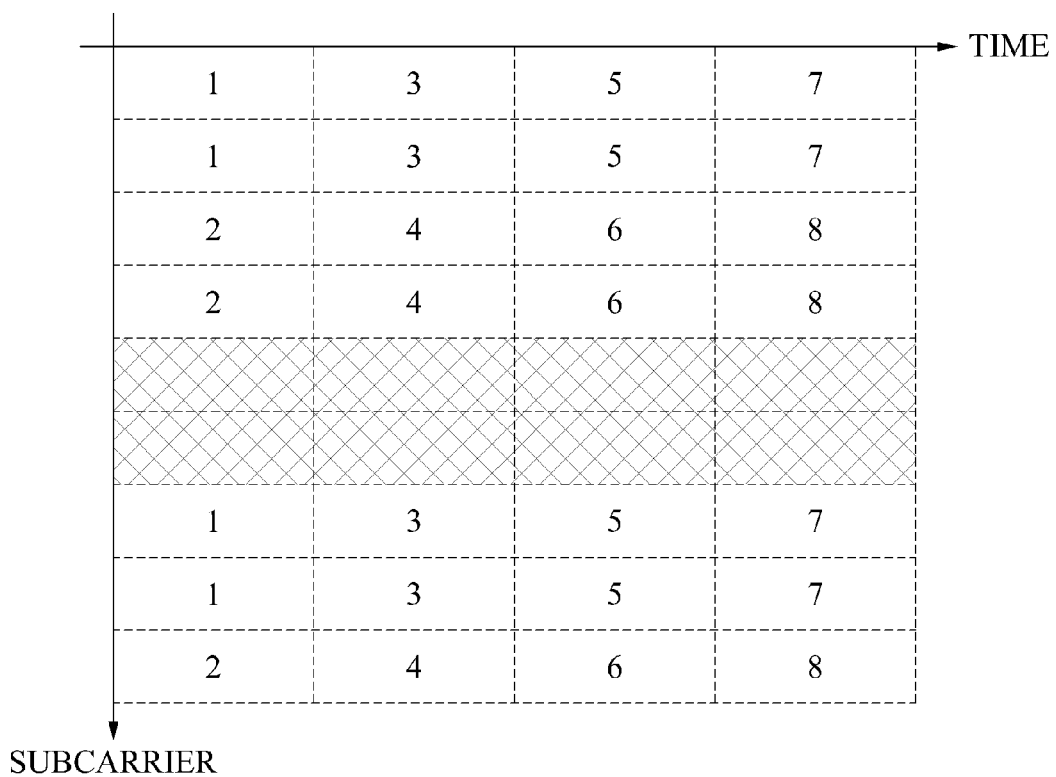
FIG. 1 is a diagram illustrating an example of a reference signal pattern that is assigned using a time division scheme.

FIG. 1 illustrates an example of a reference signal pattern that is reusably assigned using a time division scheme. The scheme of assigning a reference signal reuse pattern as shown in FIG. 1 may be applied in a Long Term Evolution (LTE) network environment. Subcarriers in a frequency domain of a single Orthogonal Frequency Division Multiplexing (OFDM) symbol may be used as a reference signal, and a reference signal pattern may be assigned to each of the subcarriers.

Referring to the example shown in FIG. 1, the reference signal reuse pattern is applied to eight femtocells using a time division scheme in which a reference signal reuse pattern is chronologically assigned to the eight femtocells. Because the state of an indoor channel may vary over time, it may be easier to divide reference signal reuse patterns based on time, in comparison to macrocells. In FIG. 1, reference signal patterns 5 and 6 are used in a neighboring macrocell, and a coherence time of a channel corresponds to four OFDM symbols. A large number of femtocells may divide reference signal reuse patterns based on the time. Accordingly, the divided reference signal reuse patterns may be distributed to the eight femtocells such that the reference signal reuse patterns do not overlap as shown in FIG. 1.

In this example, the number of reference signal reuse patterns that are not used by a neighboring macrocell among six reference signal patterns is denoted by "M", and the number of OFDM symbols corresponding to a coherence time of a channel is denoted by "N_sym." Accordingly, (M*N_sym) number of femtocells may have reference signal reuse patterns that do not overlap each other, using the time division scheme of FIG. 1.

Figure 2:
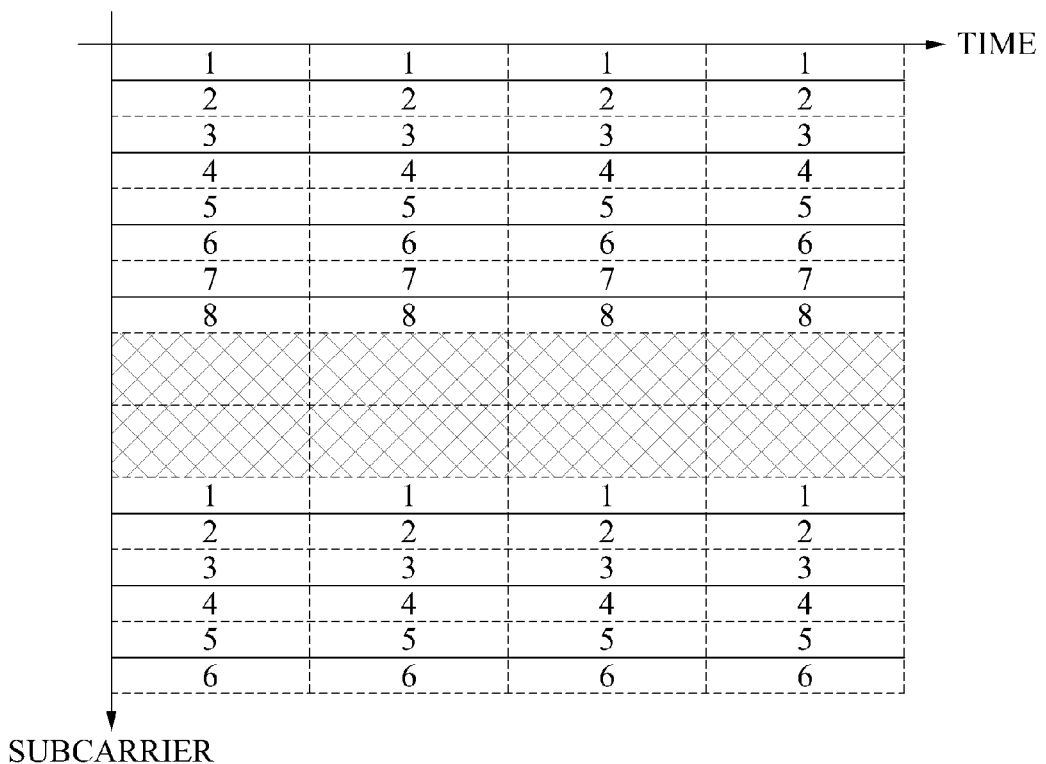
FIG. 2 is a diagram illustrating an example of a reference signal pattern that is assigned using a frequency division scheme.

FIG. 2 illustrates an example of a reference signal pattern that is reusably assigned using a frequency division scheme. The scheme of assigning a reference signal reuse pattern may also be applied in an LTE network environment. Subcarriers in a frequency domain of a single OFDM symbol may be used as a reference signal, and a reference signal pattern may be assigned to each of the subcarriers.

Referring to the example shown in FIG. 2, the reference signal reuse pattern is applied to eight femtocells using a frequency division scheme in which a reference signal reuse pattern is assigned to the eight femtocells based on a frequency. Because an indoor channel has a relatively short maximum delay spread and a relatively large coherence bandwidth, it may be easier to divide reference signal reuse patterns based on frequency, in comparison to macrocells. In FIG. 2, reference signal patterns 5 and 6 are used in a neighboring macrocell, and a coherence bandwidth of a channel is greater than eight subcarriers. A large number of femtocells may divide reference signal reuse patterns based on the time. Accordingly, the divided reference signal reuse patterns may be distributed to the eight femtocells such that the reference signal reuse patterns do not overlap as shown in FIG. 2.

In this example, the number of reference signal reuse patterns that are not used by a neighboring macrocell among six reference signal patterns is denoted by "M", the number of subcarriers contained in a single reference signal reuse pattern is denoted by "N_RS," and the number of subcarriers corresponding to a coherence bandwidth of a channel is denoted by "N_sub." Accordingly, (M*N_RS/N_sub) number of femtocells may have reference signal reuse patterns that do not overlap each other, using the frequency division scheme of FIG. 2.

Figure 3:
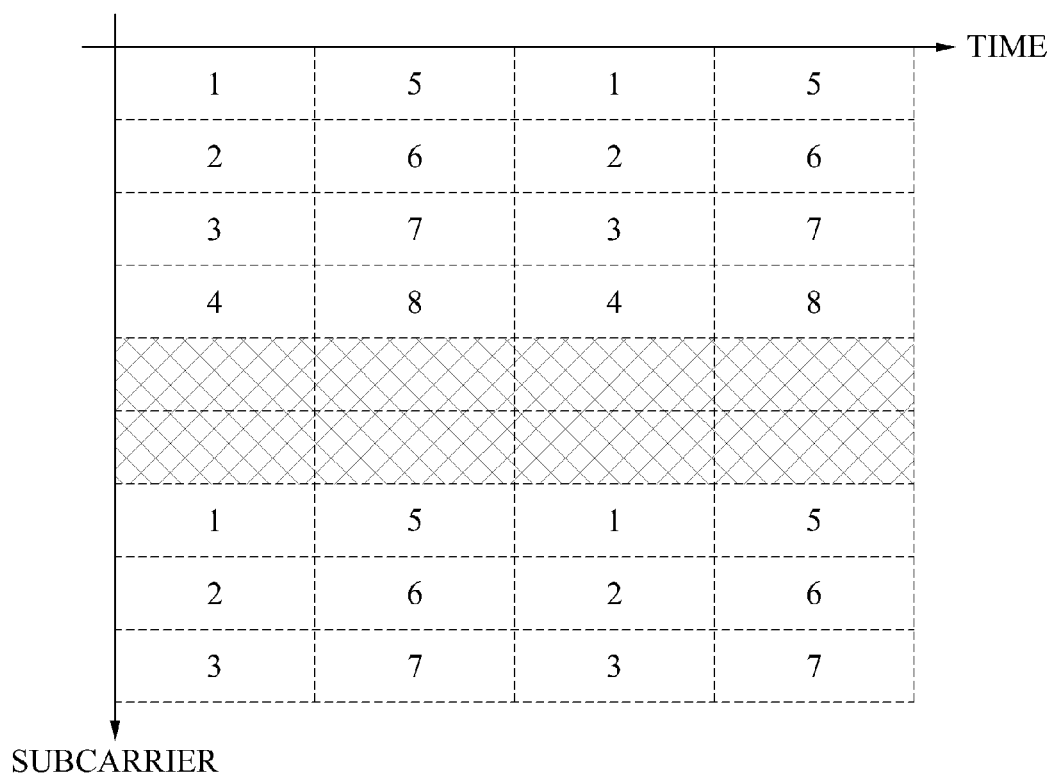
FIG. 3 is a diagram illustrating an example of a reference signal pattern that is assigned using a time division scheme and a frequency division scheme.

FIG. 3 illustrates an example of a reference signal pattern that is reusably assigned using a time division scheme and a frequency division scheme. The scheme of assigning a reference signal reuse pattern may be applied in an LTE network environment.

In FIG. 3, a hybrid scheme is described that employs both of the time division scheme and the frequency division scheme that have described with reference to FIGS. 1 and 2. In other words, femtocells may divide reference signal reuse patterns based on the time and frequency. In the example shown in FIG. 3, six reference signal patterns are assigned to eight femtocells based on the time and frequency. In FIG. 3, reference signal patterns 5 and 6 are used by a neighboring macrocell.

In this example, the number of reference signal reuse patterns that are not used by a neighboring macrocell among six reference signal patterns is denoted by "M", the number of OFDM symbols corresponding to a coherence time of a channel is denoted by "N_sym", the number of subcarriers contained in a single reference signal reuse pattern is denoted by "N_RS," and the number of subcarriers corresponding to a coherence bandwidth of a channel is denoted by "N_sub." Accordingly, ((M*N_RS/N_sub)*N_sym) number of femtocells may have reference signal reuse patterns that do not overlap each other, using the hybrid scheme of FIG. 3.

Figure 4:
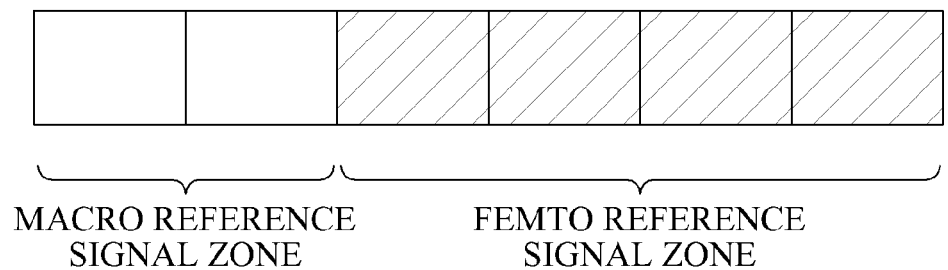
FIG. 4 is a diagram illustrating an example of reference signal reuse pattern information that is applicable to a 3rd Generation Partnership Project (3GPP)-Long Term Evolution (LTE) scheme.

FIG. 4 illustrates an example of reference signal reuse pattern information that is applicable in an LTE scheme. Referring to FIG. 4, the reference signal reuse pattern information includes a macro reference signal zone that is assigned to a macrocell, and a femto reference signal zone that is assigned to a femtocell using the schemes described above with reference to FIGS. 1 through 3.

As described herein, a reference signal pattern currently used by a neighboring macrocell may be separated from a reference signal reuse pattern assigned to a femtocell. Accordingly, it is possible to minimize interference by a femtocell.

Figure 5:
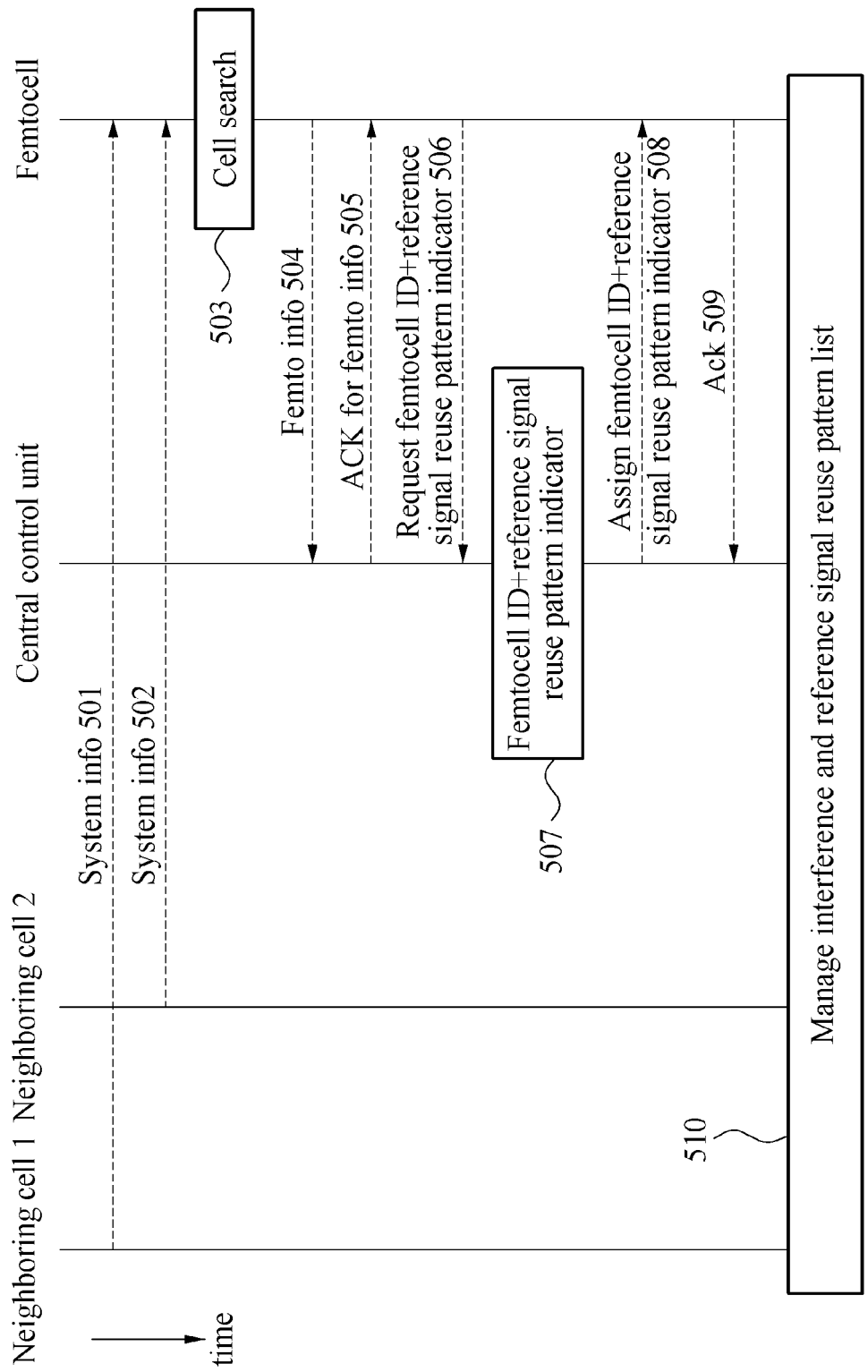
FIG. 5 is a flowchart illustrating an example of a method of assigning reference signal reuse pattern information.

FIG. 5 illustrates an example of a method of assigning reference signal reuse pattern information. Referring to FIG. 5, a central control unit may assign a femtocell identification (ID) and reference signal patterns that are to be used by the femtocell, based on neighboring macrocells.

Neighboring cells 1 and 2 of FIG. 5 may be femtocells or macrocells placed adjacent to the femtocell. In 501 and 502, the neighboring cells 1 and 2 may transmit system information (system info) to the femtocell. In 503, the femtocell may perform a cell search based on the system info received from the neighboring cells 1 and 2. The cell search in 503 may enable a variety of information to be included in the femto information (femto info), and the femtocell may transmit the femto info to the central control unit, in 504. For example, the variety of information may include cell IDs and locations of the neighboring cells 1 and 2. In 505, the femtocell may receive an acknowledgement (ACK) from the central control unit acknowledging receipt of the femto info.

The femtocell may transmit a request for a femtocell ID and a reference signal reuse pattern indicator to the central control unit, in 506. The central control unit may assign and generate the reference signal reuse pattern indicator and/or the femtocell ID in 507, and may transmit the assigned and generated reference signal reuse pattern indicator and/or the femtocell ID to the femtocell in 508. The femtocell may transmit an ACK to the control unit acknowledging receipt of the reference signal reuse pattern indicator and/or the femtocell ID, in 509. In 510, the central control unit may manage a list of reference signal reuse patterns assigned to the femtocell, and may manage a signal transmission interference between the femtocell and the neighboring cells 1 and 2 based on Quality of Service (QoS) of a user terminal connected to the femtocell. As described above, the central control unit and the femtocell may transmit or receive the information through a wired or wireless network. An example of the reference signal reuse pattern indicator generated by the central control unit in 507 is illustrated in FIG. 6.

Figure 6:
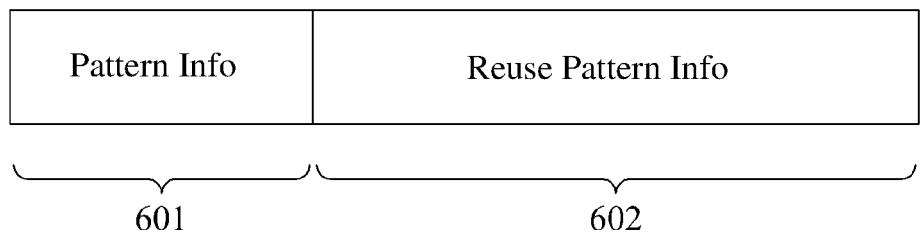
FIG. 6 is a diagram illustrating an example of a reference signal reuse pattern indicator generated by a central control unit in a multi-cell environment.

FIG. 6 illustrates an example of a reference signal reuse pattern indicator that is generated by a central control unit of a multi-cell environment. In this example, the reference signal reuse pattern indicator of FIG. 6 includes reference signal pattern information 601 and reference signal reuse pattern information 602. The central control unit may transfer information regarding the reference signal pattern to a macrocell and a femtocell using the reference signal reuse pattern indicator of FIG. 6.

Figure 7:
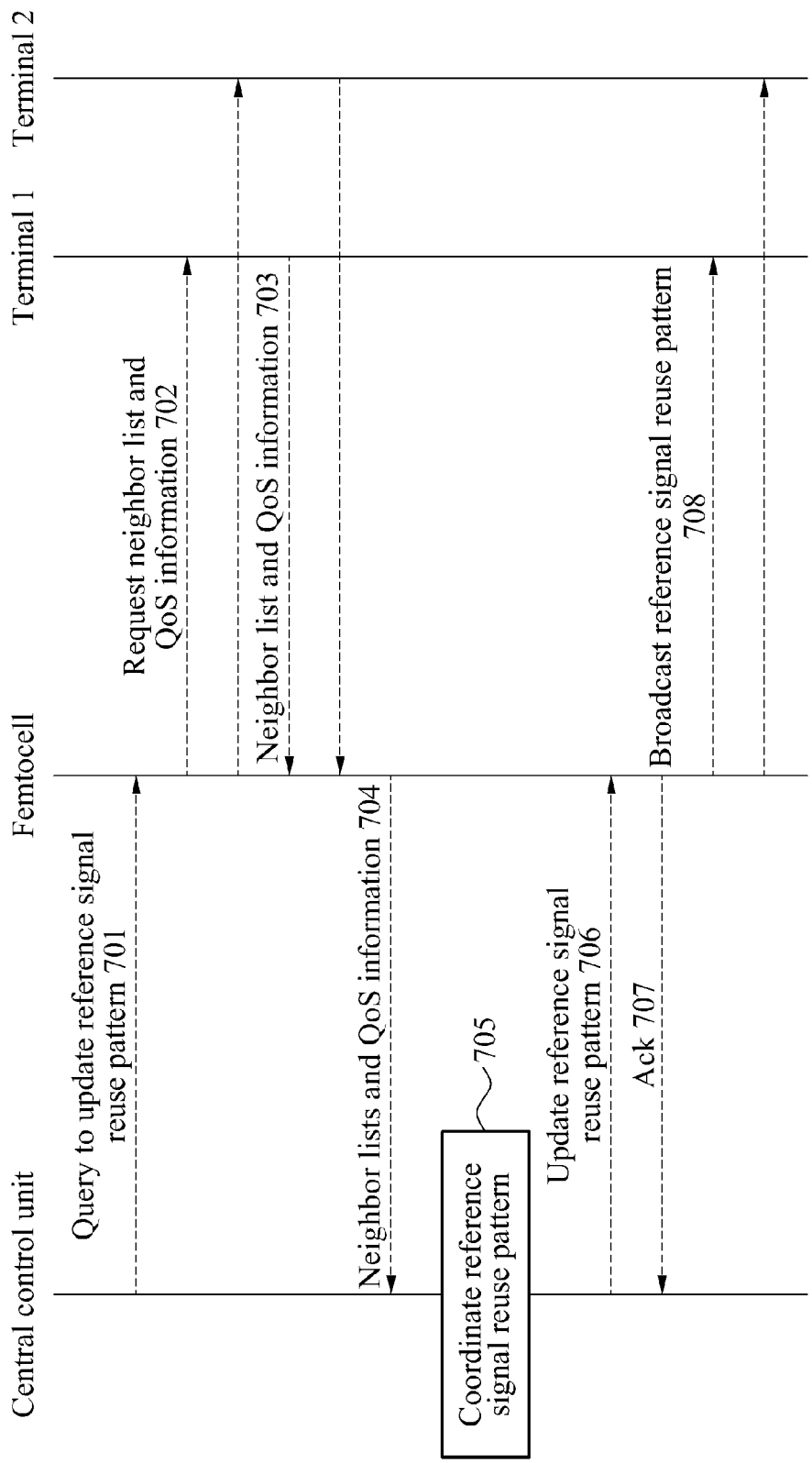
FIG. 7 is a flowchart illustrating an example of a centralized scheme of managing reference signal reuse pattern information.

FIG. 7 illustrates an example of a centralized scheme of managing reference signal reuse pattern information.

As shown in FIG. 7, a central control unit may manage reference signal reuse pattern information in a centralized manner, such that a reference signal reuse pattern is periodically updated.

The central control unit may transmit a query to update the reference signal reuse pattern to a femtocell, in 701. The query may be transmitted periodically. In 702, the femtocell may request terminals 1 and 2 to transmit neighbor lists and QoS information measured by each of the terminals 1 and 2. In this example, the terminals 1 and 2 may be located in a coverage of the femtocell. The terminals 1 and 2 may transmit the neighbor lists and QoS information to the femtocell, in 703. The femtocell may transmit the received neighbor lists and QoS information to the central control unit, in 704.

In 705, the central control unit may analyze the neighbor lists and QoS information received from the femtocell, and may coordinate the reference signal reuse pattern. In 706, the central control unit may transmit a signal to the femtocell to update the reference signal reuse pattern, and the femtocell may transmit an ACK acknowledging receipt of the signal to the central control unit, in 707. In 708, the femtocell may receive reference signal reuse pattern information from the central control unit, and may broadcast the received reference signal reuse pattern information to the terminals 1 and 2 that are located in a coverage area of the femtocell.

Figure 8:
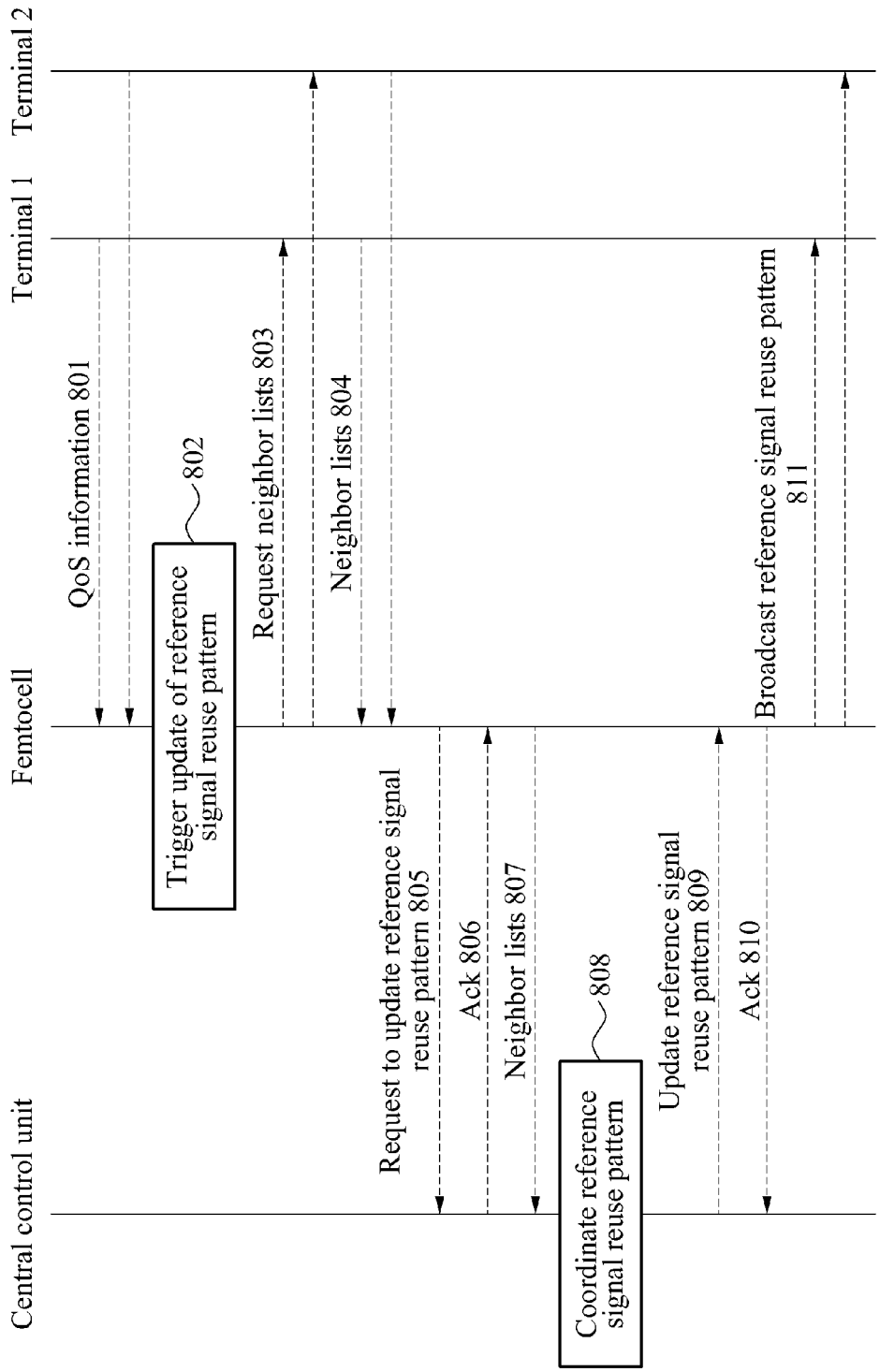
FIG. 8 is a flowchart illustrating another example of a centralized scheme of managing reference signal reuse pattern information.

FIG. 8 illustrates an example of a centralized scheme of managing reference signal reuse pattern information.

As shown in the example of FIG. 8, a central control unit may manage reference signal reuse pattern information in a centralized manner, such that a reference signal reuse pattern is updated aperiodically. For example, the reference signal reuse pattern information may be updated using an event triggering scheme.

Terminals 1 and 2 may report QoS information to the femtocell, in 801. In this example, the terminals 1 and 2 may be located in a coverage area of the femtocell. In 802, the femtocell may analyze the QoS information received from the terminals 1 and 2, and may trigger a routine to update a reference signal reuse pattern when the QoS is equal to or less than a predetermined threshold. The femtocell may request the terminals 1 and 2 to transmit neighbor lists in 803, and may receive the neighbor lists from the terminals 1 and 2, in 804. The femtocell may transmit a request to update a reference signal reuse pattern to the central control unit, in 805, and may receive an ACK acknowledging receipt of the request from the central control unit, in 806. The femtocell may transmit the received neighbor lists to the central control unit, in 807, and the central control unit may analyze the neighbor lists and may coordinate the reference signal reuse pattern, in 808. The central control unit may transmit a signal to update the reference signal reuse pattern to the femtocell, in 809. In response to the signal, the femtocell may transmit an ACK to the central control unit, in 810. In 811, the femtocell may receive reference signal reuse pattern information from the central control unit, and may broadcast the received reference signal reuse pattern information to the terminals 1 and 2.

Figure 9:
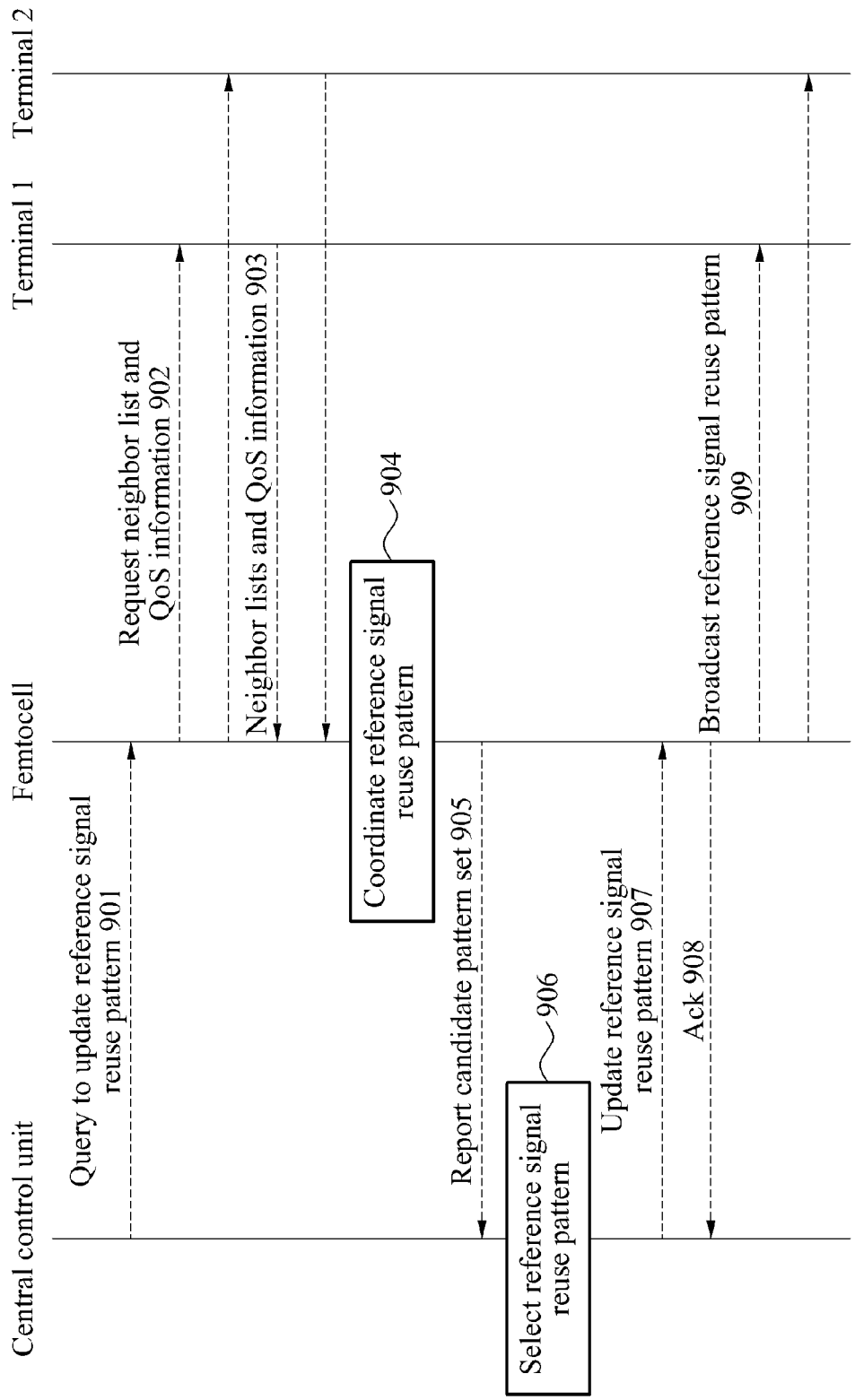
FIG. 9 is a flowchart illustrating an example of a distributed scheme of managing reference signal reuse pattern information.

FIG. 9 illustrates an example of a distributed scheme of managing reference signal reuse pattern information.

As shown in the example of FIG. 9, a femtocell may coordinate reference signal reuse pattern information in a distributed manner, such that a reference signal reuse pattern may be updated periodically.

In 901, a central control unit may transmit a query to update the reference signal reuse pattern to the femtocell. The query may be periodically transmitted to the femtocell. The femtocell may request terminals 1 and 2 to transmit neighbor lists and QoS information measured by each of the terminals 1 and 2, in 902. In this example, the terminals 1 and 2 may be located in a coverage area of the femtocell. The terminals 1 and 2 may transmit the neighbor lists and QoS information to the femtocell, in 903. The femtocell may analyze the neighbor lists and QoS information received from the terminals 1 and 2, and may coordinate the reference signal reuse pattern, in 904. The femtocell may report a candidate pattern set to the central control unit, in 905.

In 906, the central control unit may analyze the candidate pattern set received from the femtocell, and may select a reference signal reuse pattern from the candidate pattern set. The central control unit may transmit a signal to update a reference signal reuse pattern to the femtocell, in 907. In this example, the signal may contain information on the reference signal reuse pattern selected in 906. In response to the signal, the femtocell may transmit an ACK to the central control unit in 908. In 909, the femtocell may receive reference signal reuse pattern information from the central control unit, and may broadcast the received reference signal reuse pattern information to the terminals 1 and 2 that are located in a coverage area of the femtocell.

Figure 10:
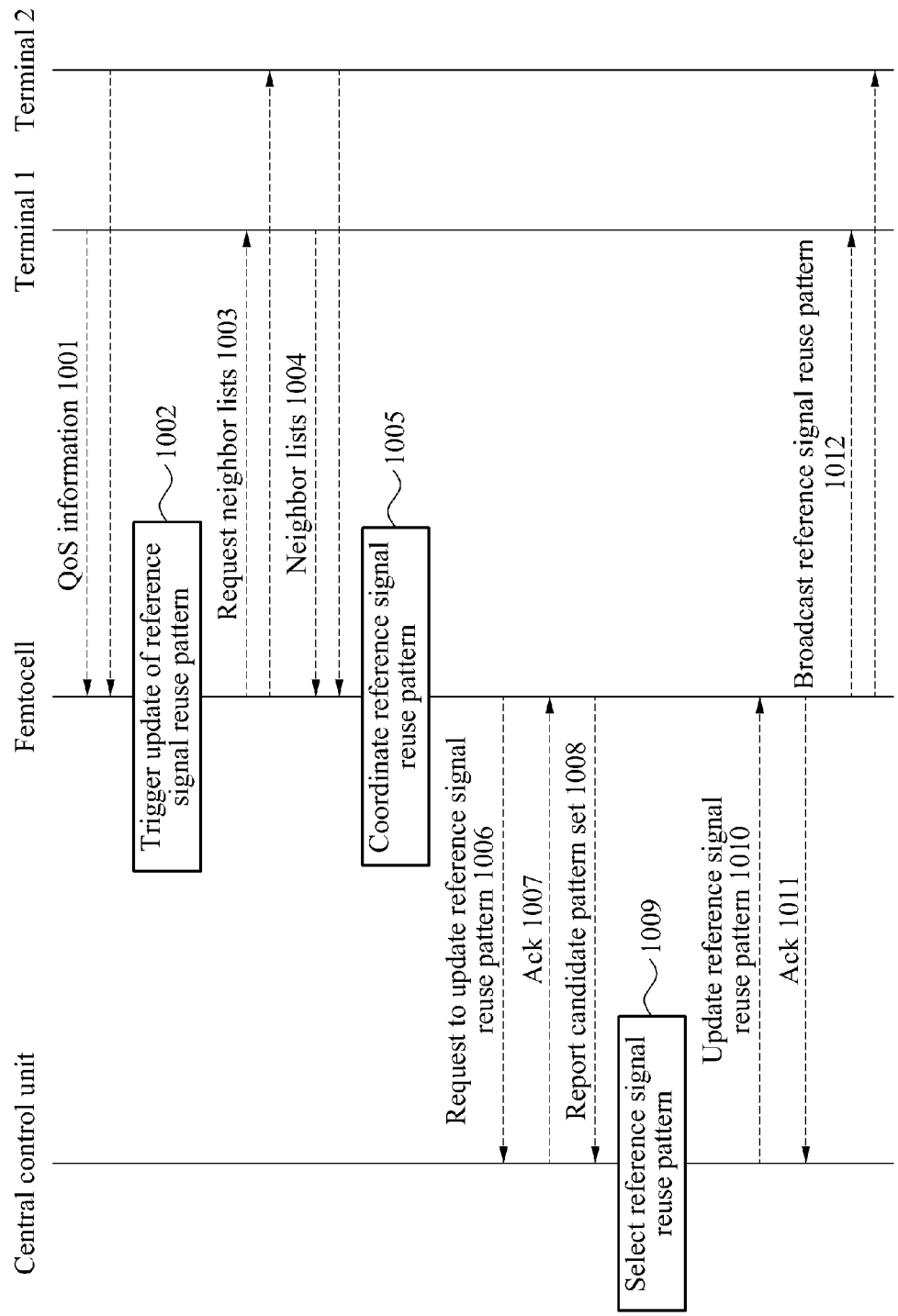
FIG. 10 is a flowchart illustrating an example of a distributed scheme of managing reference signal reuse pattern information.

FIG. 10 illustrates an example of a distributed scheme of managing reference signal reuse pattern information.

As shown in FIG. 10, a femtocell may coordinate reference signal reuse pattern information in a distributed manner, such that a reference signal reuse pattern may be updated aperiodically. For example, the reference signal reuse pattern information may be updated using an event triggering scheme.

Referring to FIG. 10, terminals 1 and 2 may report QoS information to the femtocell, in 1001. In this example, the terminals 1 and 2 may be located in a coverage area of the femtocell. In 1002, the femtocell may analyze the QoS information received from the terminals 1 and 2, and may trigger a routine to update a reference signal reuse pattern when the QoS is equal to or less than a predetermined threshold. The femtocell may request the terminals 1 and 2 to transmit neighbor lists, in 1003, and may receive the neighbor lists from the terminals 1 and 2, in 1004. The femtocell may analyze the QoS information and the neighbor lists received from the femtocell, and may coordinate the reference signal reuse pattern, in 1005.

The femtocell may transmit a request to update the reference signal reuse pattern to the central control unit, in 1006, and may receive an ACK acknowledging receipt of the request from the central control unit, in 1007. In 1008, the femtocell may report a candidate pattern set to the central control unit.

The central control unit may analyze the candidate pattern set received from the femtocell, and may select a reference signal reuse pattern from the candidate pattern set, in 1009. The central control unit may transmit a signal to update a reference signal reuse pattern to the femtocell, in 1010. In this example, the signal may include information about the reference signal reuse pattern selected in 1009. In response to the signal, the femtocell may transmit an ACK to the central control unit, in 1011. In 1012, the femtocell may receive reference signal reuse pattern information from the central control unit, and may broadcast the received reference signal reuse pattern information to the terminals 1 and 2.

As another example of the distributed scheme described above with reference to FIGS. 9 and 10, a femtocell and terminals may perform the methods using reference signal reuse pattern information.

In an environment that includes a large number of interference sources, such as femtocells, channels may be estimated in order to apply an interference control scheme, for example, a Dynamic Spectrum Management (DSM) scheme or an Interference Alignment (IA) scheme. Each terminal may estimate channels using one or more reference signals in a reference signal reuse pattern assigned to a femtocell, through the schemes of FIGS. 9 and 10. When a channel estimation is performed with respect to a single OFDM symbol contained in an OFDM frame, a channel estimation may be performed between a corresponding femtocell base station and a terminal. Accordingly, reference signals in the reference signal reuse pattern may be designed to be orthogonal to each other.

For example, a reference signal transmitted to each terminal in a femtocell base station may be selected randomly for each OFDM symbol in a reference signal reuse pattern, by hopping between the OFDM symbols in the reference signal reuse pattern. In this example, a random seed may be a femtocell ID of a corresponding femtocell.

The selected reference signal may be multiplied by a phase term based on the femtocell ID in a corresponding femtocell base station, and may be transmitted to a terminal.

Accordingly, there is no need for femtocell base stations to perform additional communication therebetween to select a reference signal. An example of this scheme may be as shown below.

First, the following variables may be set.

(1) $N_s$: the number of OFDM symbols constituting a single OFDM frame.

(2) $N_{pp}$: the number of orthogonal reference signal patterns. A single OFDM symbol may select a reference signal pattern from among Npp reference signal patterns.

(3) $N_{fem}$: the number of femtocell base stations that affect a terminal.

As described above, when channels are estimated from at least one OFDM symbol among $N_s$ OFDM symbols, a terminal may determine whether a channel estimation of an OFDM frame to which the at least one OFDM symbol belongs is successfully performed. Additionally, when all OFDM frames succeed in channel estimation, the terminal may determine that channels are estimated.

The probability of success in channel estimation of a femtocell 1 from a first OFDM symbol may be represented by the following Equation 1.

$$p_{success\ at\ symbol1}^{femto1} = \left(\frac{N_{pp}-1}{N_{pp}}\right)^{N_{fem}-1}. \quad \text{[Equation 1]}$$

In Equation 1, when $N_{fem}-1$ femtocells (other than the femtocell 1) select reference signals from $N_{pp}-1$ orthogonal reference signal patterns, that are not used by the femtocell 1, the femtocell 1 may enable the channel estimation.

The probability that the femtocell 1 may successfully estimate channels from $N_s$ symbols at least once using Equation 1 may be represented by the following Equation 2.

$$p_{success\ for\ N_s symbols}^{femto\ 1} = 1 - (1-p_{success\ at\ symbol\ 1}^{femto\ 1})^{N_s} \quad \text{[Equation 2]}$$

The probability that $N_{fem}$ femtocells may successfully estimate channels from the $N_s$ symbols using Equation 2 may be represented by the following Equation 3.

$$p_{success} = \left(p_{success\ for\ N_s\ symbols}^{femto1}\right)^{N_{fem}} = \left(1-\left(1-\left(\frac{N_{pp}-1}{N_{pp}}\right)^{N_{fem}-1}\right)^{N_s}\right)^{F_{fem}}. \quad \text{[Equation 3]}$$

"$N_{pp}$", for example, the number of reference signal patterns used to ensure a predetermined probability of success may be obtained by applying Equation 3 to the following Equation 4.

$$N_{pp} = \frac{1}{1-\left(1-\left(1-(p_{success})^{1/N_{fem}}\right)^{1/N_s}\right)^{1/(N_{fem}-1)}}. \quad \text{[Equation 4]}$$

In Equations 3 and 4, when the probability of success in channel estimation and "$N_{pp}$" are calculated, "$N_{fem}$" may be set to be a constant value. In an actual application, $N_{fem}$ may not be changed, that is, a probability of frequently turning on or off a femtocell base station device may be low. However, when a Probability Mass Function (PMF) where $N_{fem}$ is a random variable, is represented by "$f(N_{fem})$", the probability that all femtocells may successfully estimate channels for $N_s$ symbols may be modified based on the PMF, as shown in Equation 5 below.

$$p_{success} = \sum_{N_{fem}=0}^{\infty} f(N_{fem})\left(1-\left(1-\left(\frac{N_{pp}-1}{N_{pp}}\right)^{N_{fem}-1}\right)^{N_s}\right)^{F_{fem}} \quad \text{[Equation 5]}$$

"$N_{pp}$" may be obtained by applying Equation 5 to the following Equation 6.

$$N_{pp} = \sum_{N_{fem}=0}^{\infty} f(N_{fem}) \quad \text{[Equation 6]}$$
$$\left(1 \Big/ \left(1-\left(1-(1-(p_{success})^{1/N_{fem}})^{1/N_s}\right)^{1/(N_{fem}-1)}\right)\right).$$

Figure 11:
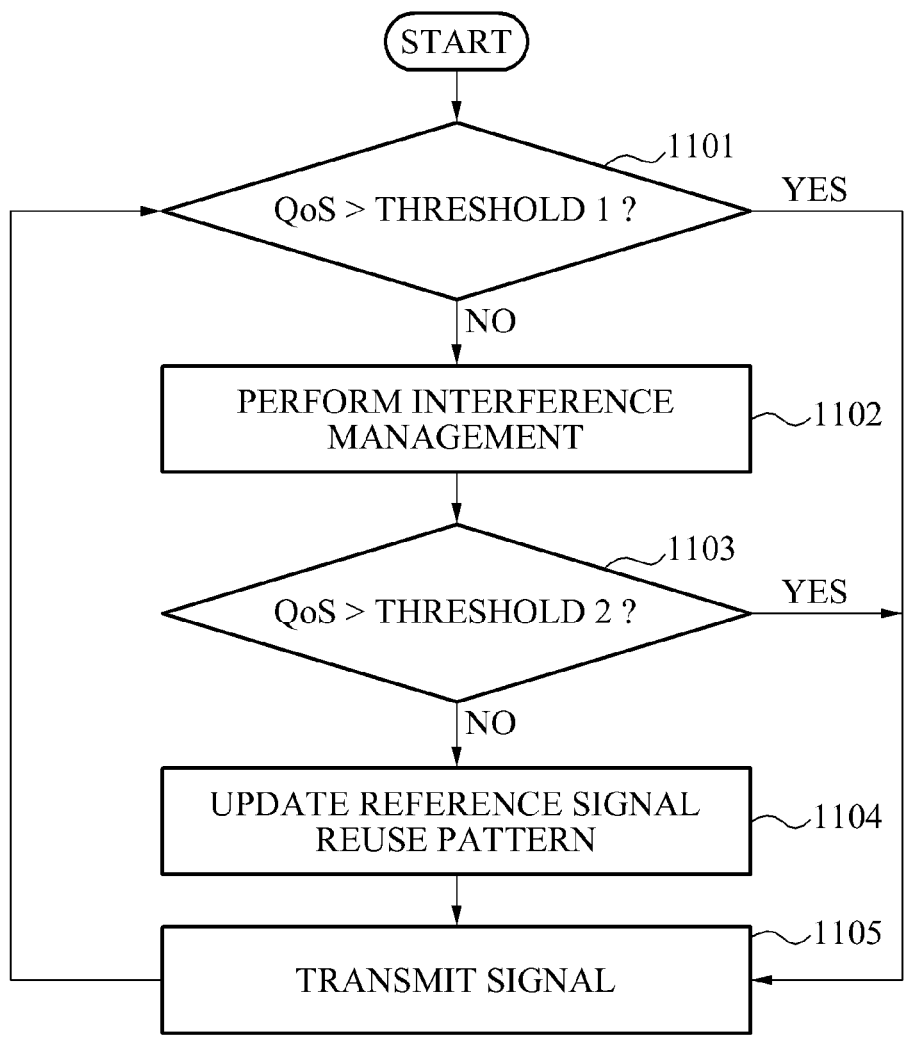
FIG. 11 is a flowchart illustrating an example of a method of performing an interference management and an update of a reference signal reuse pattern based on Quality of Service (QoS) information of a user terminal.

FIG. 11 illustrates an example of a method of performing an interference management and an update of a reference signal reuse pattern based on QoS information of a user terminal.

Referring to FIG. 11, a central control unit may analyze QoS information received from a user terminal located in a femtocell, and may adaptively perform an interference management and an update of a reference signal reuse pattern based on the analyzed QoS information. For example, the central control unit may determine whether the QoS exceeds a threshold 1, in 1101. When the QoS is determined to be equal to or less than the threshold 1, the central control unit may perform the interference management, in 1102. In this example, the interference management may be performed using at least one of a DSM scheme, an Adaptive Power Control (APC) scheme, and a Coordinated Beamforming (CBF) scheme. Conversely, when the QoS is determined to exceed the threshold 1, the central control unit may continue to transmit a signal, in 1105.

Additionally, the central control unit may determine whether the QoS exceeds a threshold 2, in 1103. When the QoS is determined to be equal to or less than the threshold 2, the central control unit may update the reference signal reuse pattern as described above, in 1104. Subsequently, the central control unit may continue to transmit a signal, in 1105. Additionally, in 1103, when the QoS is determined to exceed the threshold 1, the central control unit may continue to transmit a signal without updating the reference signal reuse pattern, in 1105.

Figure 12:
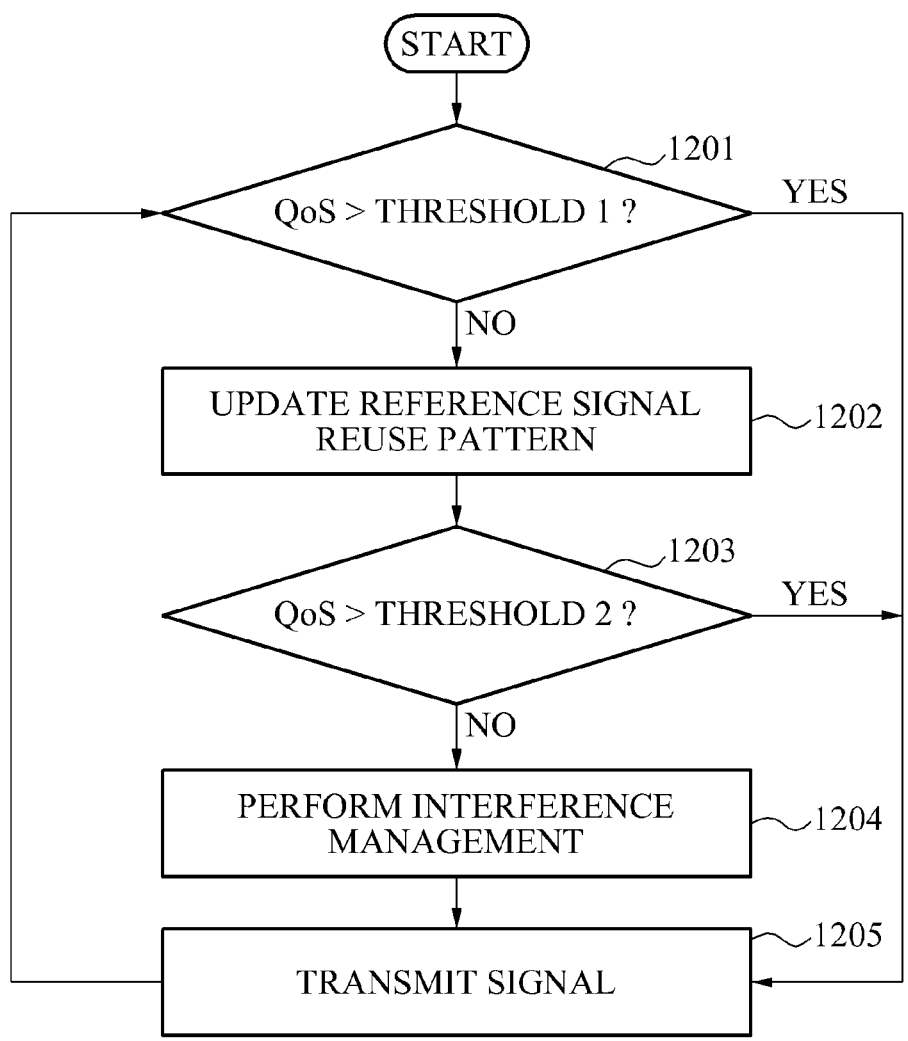
FIG. 12 is a flowchart illustrating an example of a method of performing an interference management and an update of a reference signal reuse pattern based on QoS information of a user terminal.

FIG. 12 illustrates an example of a method of performing an interference management and an update of a reference signal reuse pattern based on QoS information of a user terminal.

Referring to FIG. 12, a central control unit may analyze QoS information received from a user terminal located in a femtocell, and may adaptively perform an interference management and an update of a reference signal reuse pattern based on the analyzed QoS information. For example, the central control unit may determine whether the QoS exceeds a threshold 1, in 1201. When the QoS is determined to be equal to or less than the threshold 1, the central control unit may update a reference signal reuse pattern, in 1202. Conversely, when the QoS is determined to exceed the threshold 1, the central control unit may continue to transmit a signal, in 1205.

Additionally, the central control unit may determine whether the QoS exceeds a threshold 2, in 1203. When the QoS is determined to be equal to or less than the threshold 2, the central control unit may perform the interference management, in 1204. As described above, the interference management may be performed using, for example, at least one of a DSM scheme, an APC scheme, a CBF scheme, and the like. Conversely, when the QoS is determined to exceed the threshold 2, the central control unit may continue to transmit a signal, in 1205.

The above-described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. Examples of program instructions include both machine code, such as produced by a compiler, and files containing higher level code that may be executed by the computer using an interpreter. The described hardware devices may be configured to act as at least one software module in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of managing a reference signal pattern in a multi-cell environment performed by a femtocell, the method comprising:

receiving signal quality information from at least one terminal;

triggering a request to update a reference signal reuse pattern based on the signal quality information;

receiving a neighbor list from the terminal, wherein the neighbor list comprises at least one neighboring cell located adjacent to the femtocell;

transmitting the triggered request and the neighbor list to a central control unit; and receiving reference signal reuse pattern information from the central control unit and broadcasting the received reference signal reuse pattern information to the terminal.

2. A method of managing a reference signal pattern in a multi-cell environment performed by a femtocell, the method comprising:

receiving a neighbor list and signal quality information from at least one terminal, the neighbor list comprising at least one neighboring cell located adjacent to the femtocell;

transmitting, to a central control unit, candidate pattern information for a reference signal reuse pattern based on the neighbor list and the signal quality information; and receiving reference signal reuse pattern information from the central control unit and broadcasting the received reference signal reuse pattern information to the terminal.

3. The method of claim 2, further comprising:

receiving a request to update the reference signal reuse pattern from the central control unit, wherein the request is triggered based on the signal quality information, the candidate pattern information is generated based on the neighbor list, and the signal quality information is collected by the network devices and received from at least one terminal.

4. The method of claim 2, further comprising:

receiving a query to update the reference signal reuse pattern from the central control unit, wherein the query is periodically received and the candidate pattern information is generated based on the neighbor list.

5. A method of acquiring a reference signal pattern of a terminal located in a multi-cell environment, the method comprising:

transmitting, to a network device of a femtocell, signal quality information and a neighbor list, wherein the neighbor list comprises at least one neighboring cell located adjacent to the femtocell; and receiving reference signal reuse pattern information from the network device, wherein the reference signal reuse pattern information is selected among candidate pattern information and the candidate pattern information is generated based on the signal quality information and the neighbor list.

* * * * *